March 10, 1936.  L. V. ARONSON  2,033,108
FLAME PRODUCING MECHANISM AND ASSOCIATED RECEPTACLE
Filed Feb. 3, 1930  2 Sheets-Sheet 2
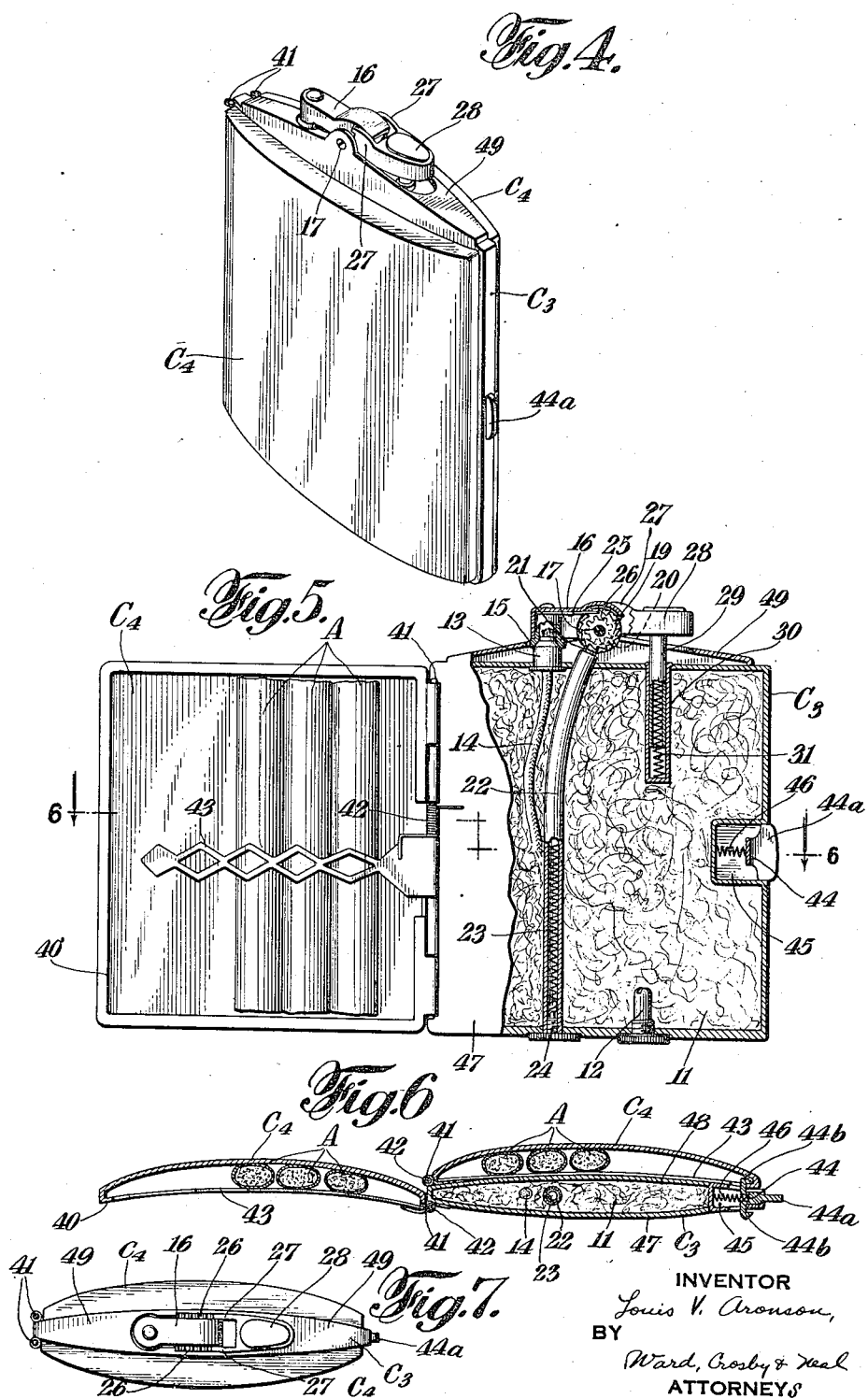
INVENTOR
Louis V. Aronson,
BY
Ward, Crosby & Neal
ATTORNEYS Patented Mar. 10, 1936

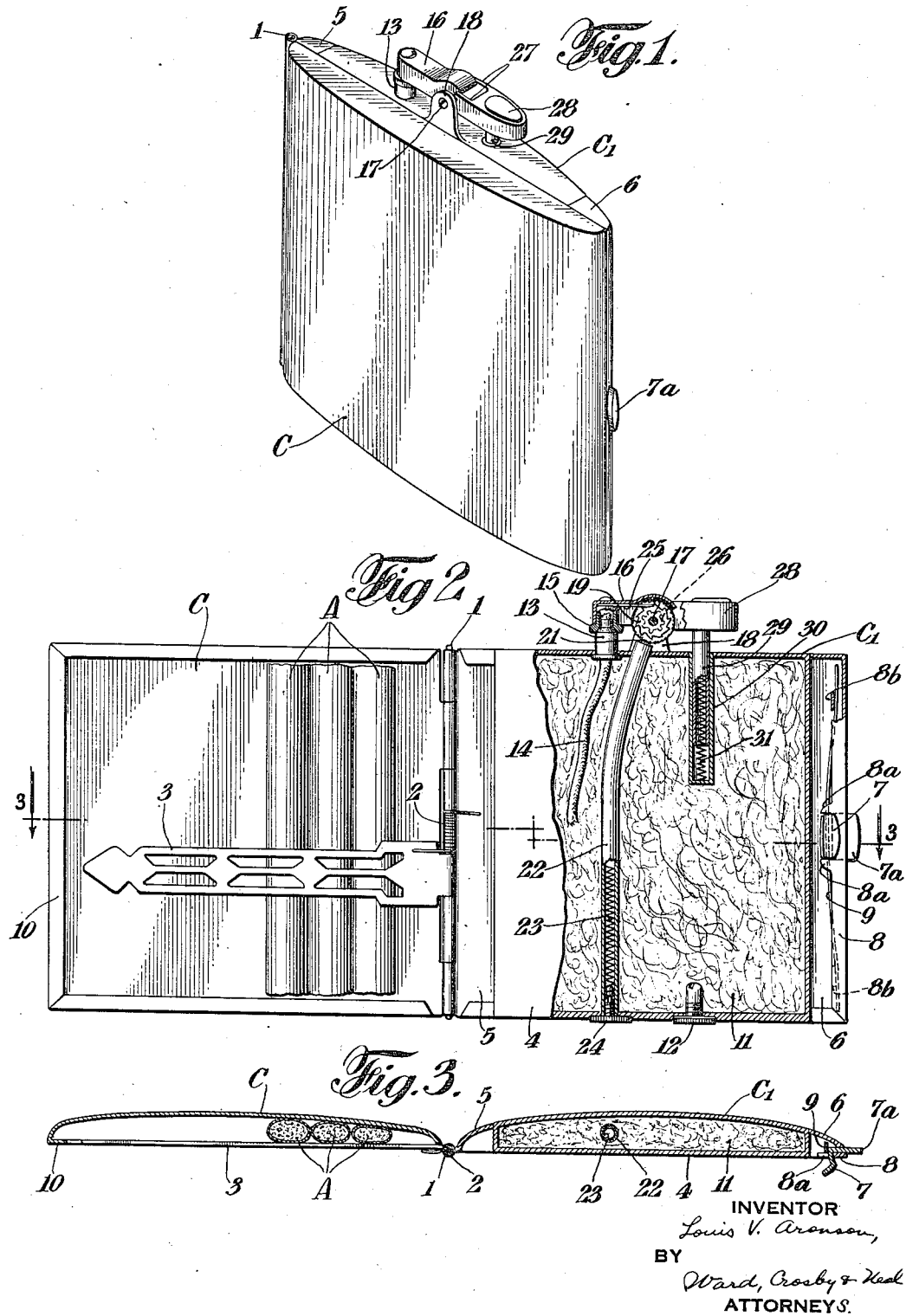

2,033,108

UNITED STATES PATENT OFFICE 2,033,108

FLAME-PRODUCING MECHANISM AND ASSOCIATED RECEPTACLE

Louis V. Aronson, Newark, N. J., assignor to Art Metal Works, Inc., a corporation of New Jersey Application February 3, 1930, Serial No. 425,393

2 Claims. (Cl. 206—41.4)

My invention relates to an article or device including flame-producing mechanism, as pyrophoric lighting mechanism and also including a receptacle, casing, container or the like for cigarettes, cigars or similar articles, the latter hereinafter being generically termed "cigarettes".

My invention relates to an article or device, as aforesaid, having the characteristics noted above and arranged in a simple, satisfactory and convenient manner.

My invention, in one of its prominent phases, relates to a fuel casing having a cigarette containing casing pivotally or otherwise suitably connected thereto.

Various other objects, advantages and characteristics of my invention will become apparent from the following description taken in connection with the accompanying drawings.

My invention resides in the article or device, features, combined arrangements and novel combination of parts of the character hereinafter described and claimed.

For an illustration of some of the various forms my invention may take, reference is to be had to the accompanying drawings, in which:

Figure 1 is a perspective view of an article or device constructed in accordance with my invention.

Figure 2 is a front elevational view of the device of Figure 1 but partly broken away and with the cigarette-containing casing in open position.

Figure 3 is a transverse, horizontal sectional view taken on the line 3—3 of Figure 2 looking in the direction of the arrows.

Figure 4 is a perspective view of another article or device constructed in accordance with my invention.

Figure 5 is a front elevational view of the device of Figure 4 but partly broken away and with the cigarette-containing casing in open position.

Figure 6 is a transverse, horizontal sectional view taken on the line 6—6 of Figure 5 and looking in the direction of the arrows.

Figure 7 is a plan view of the device shown in Figure 1.

Referring to Figures 1, 2, and 3, C represents a casing or receptacle of suitable configuration which is adapted to contain a plurality of cigarettes A or the like. In the example shown, casing C is shallow and dish-shaped in character, the height thereof slightly exceeding the length of ordinary cigarettes A, a plurality of which are shown as disposed therein in the intended manner, Figures 2 and 3.

In accordance with my invention, the casing C is pivotally related in any suitable manner to the fuel casing or receptacle C1 of suitable flame-producing mechanism as hereinafter described. As herein illustrated although not necessarily, such pivotal relation is effected by providing a plurality of spaced, perforated ears along those respective edges of the casings C and C1 which are intended to be secured together. Then, after the perforations in such ears have been brought into alinement, a pin or rod 1 is passed therethrough, the same forming the pivotal axis for the aforesaid casings.

Preferably, the two casings C and C1 are so controlled that they are biased toward or into open position such as shown, for example, in Figures 2 and 3. To this end, a spring 2 may be coiled about the pin 1, the ends thereof being anchored on the respective casings in such relation that movement of said casings to closed position causes the spring 2 to be wound and energy stored therein.

As herein shown, a keeper or member 3, preferably of resilient, sheet material is provided to retain the cigarettes A against casual displacement from the casing C. Preferably, the keeper 3, when provided, is pivoted on the aforesaid pin 1 and has one end of the spring 2 co-acting therewith in such manner that said keeper 3 is biased into engagement with the cigarettes A or in a clockwise direction, Figure 3.

The fuel casing C1 may be of any suitable configuration. In accordance with my invention, one wall or face 4 thereof functions as a cover or closure member for the casing C and preferably, therefore, although not necessarily, said wall is plane or sheet-like as illustrated particularly in Figure 3.

The end walls of the casing C1 are shown as disposed substantially at right angles to the wall 4 and to said end walls, the respective shell sections 5 and 6 being soldered, or otherwise suitably secured. With a construction of this character, the casings C and C1 are not pivoted directly together since the casing C is pivoted directly to the shell section 5.

Latching mechanism of any suitable character is provided for retaining the casings C and C1 in closed position as illustrated in Figure 1. As herein shown, such latching mechanism comprises an angular latch member 7 disposed between lugs 8a, 8a of a flange 8 formed on the shell member 6, said latch member 7 comprising an exterior actuating section 7a movable through a slot formed in the shell section 6. The latch member 7 is carried by a leaf spring 9 disposed behind lugs 8b depending from the flange 8.

The casing C comprises a flange 10, the two flanges 8 and 10, when the casings C and C1 are closed, being disposed in abutting parallel relation. Just prior to the time that the two casings are brought to fully closed position, the angular latch member 7 and the flange 10 come into engagement, the flange 10, during continued closing movement, forcing the latch member 7 toward the fuel casing against the action of spring 9. As soon as the flange 10 clears the high part of latch member 7, the flanges 8 and 10 come into abutting relation and are so held, in response to the action of spring 9, by co-action effected between the latch member 7 and flange 10.

Obviously, any other suitable form of latching mechanism may be substituted for that described above. When the casings C and C1 are in closed position as illustrated in Figure 1, it is desirable that the resultant structure be substantially elliptical when viewed from the top. To produce this effect, the exterior surfaces of the casings C and C1 should be substantially semi-elliptical, Figure 3, the shell sections 5 and 6 having their outer surfaces properly merging into the exterior surface of the fuel casing proper. It shall be distinctly understood, however, that the complete structure may appear otherwise than as illustrated in Figure 1. Moreover, it shall be understood that the shell sections 5 and 6 may be omitted or modified as desired.

The casing C1 is adapted to contain fuel of any suitable character, either solid, semi-solid or liquid such, for example, as is well known to the art for use in connection with pyrophoric lighting mechanism. As herein illustrated, said casing C1 contains a mass of material 11, as cotton, for absorbing the fuel which may be introduced into the casing in any suitable manner, as through a suitable filling opening closed by a plug 12.

In accordance with my invention, pyrophoric lighting mechanism is associated with the casing C1. It shall be distinctly understood that such lighting mechanism may be of any suitable character and that it may be disposed on or mounted in said casing C1 in any suitable and desired manner. As one of the many forms of such arrangements, I have herein shown a wick tube 13 through which from the interior of the casing C1 extends a wick 14. Co-acting with the wick tube 13 is a snuffer cap 15 carried at one end of a lever 16 mounted on a pin or axle 17 carried by spaced standards 18, 18 upstanding from the top wall of casing C1. The lever 16 is of channel-like configuration and disposed in inverted relation. Between its side walls and freely rotatable on the pin 17 is a ratchet wheel 19 and another wheel 20 having a serrated or roughened exterior peripheral face. The wheels 19 and 20 are disposed side-by-side and are movable together as a unit. A pyrophoric element 21 co-acts with the wheel 20, this element projecting from a tube 22 extending through and carried by the casing C1. For biasing the pyrophoric element 21 into engagement with the wheel 20, the tube 22 is shown as containing a removable helical spring 23 held under the desired degree of tension by a plug 24 threaded into the lower end thereof.

To the end that uni-directional rotative movement may be imparted to the wheel 20, a pawl 25, co-actable with the ratchet wheel 19, is secured to the lever 16 by the stem of the snuffer cap 15.

Gear wheels 26, 26 are secured to the exterior surfaces of the respective side walls of the lever 16. With the gear wheels 26, 26, rack members 27, 27 mesh, respectively, said rack members merging into a knob 28 connected to a stem 29 reciprocatory in a sleeve 30 carried by the top wall of casing C1 and depending into the latter, the stem 29 being biased upwardly, Figure 2, by a helical spring 31 disposed in the sleeve 30.

When the knob 28 is manually depressed, the rack members 27 rotate the gear wheels 26 in a clockwise direction, Figure 2, to thereby tilt the lever 16 in the same direction. During such tilting movement the pawl 25 coacts with the ratchet wheel 19 to rotate the wheel 20 in a clockwise direction, Figure 2, whereby a shower of sparks are produced to ignite fuel at the now exposed end of wick 14.

When pressure on the knob 28 is released, the parts operate in a sense the reverse of that just described with the exception of the wheels 19 and 20, which remain stationary due to the fact that during counter-clockwise movement, Figure 2, of lever 16, the pawl 25 idles with respect to the ratchet wheel 19.

Referring to Figures 4, 5, 6, and 7, there is illustrated another form of my invention. In this example, a fuel casing or receptacle C3 has pivoted thereto the cigarette-containing casings or receptacles C4, C4 which, as shown, are duplicates, it being understood however that said receptacles C4, C4 may differ from each other in such respects as may be desirable.

As herein illustrated, each casing C4 is dish-shaped and its side wall structure, preferably, terminates in an inwardly-directed flange structure 40. The pivotal connection between each casing C4 and the casing C3 may be substantially as hereinbefore described in connection with Figures 1–3. If so, a plurality of spaced, perforated ears may be provided along the front and rear faces of the casing C3 immediately adjacent one end thereof and similarly spaced, perforated ears are provided at the end of each casing C4. With the sets of ears properly alined, pins or members 41, 41 are passed through the respective sets, said pins constituting the respective pivotal axes of the casings C4.

For biasing the casings C4 to open position, a spring 42 may be wound about each pin 41, the ends of each spring contacting, respectively, with the casing C3 and the associated casing C4. If desired, each casing C4 may have associated therewith a keeper 43 of light, resilient material, one end of each spring 42 contacting with each keeper 43, as illustrated, to bias the keepers toward the bottoms of their respective casings or into engagement with the cigarettes A lodged therein.

Latching mechanism of any suitable character may be utilized for retaining the various casings in the relation shown in Figures 4 and 7. If desired, each casing C4 may have individual latching mechanism associated therewith or, as herein illustrated, a single latching mechanism may be utilized and this may comprise a member 44 disposed for reciprocatory movement in a chamber 45 formed in the fuel casing C3, said member 44 being suitably biased from left to right, Figures 5 and 6, by a helical spring 46. The member 44 comprises an actuating section 44a movable through a slot opening into the chamber 45. Member 44 also comprises oppositely extending latching sections 44b, 44b extending respectively, through elongated slots formed in opposite side walls of the chamber 45.

When one of the casings C4 is to be closed and just before it reaches its fully closed position, a section of the flange 40 thereof engages the wedge-shaped surface of the adjacent latching section 44b and, during continued movement of said casing C4, forces said latching section 44b from right to left, Figure 6, with resultant compression of the spring 46. Just as said casing C4 reaches its fully closed position, the aforesaid flange section clears said last named latching section 44b and the spring 46 immediately restores the latter to its original position where engagement is effected by said latching section 44b with the inner surface of said flange section. This condition obtains until release is effected by pressure applied to the actuating section 44a of member 44 of sufficient extent to cause said latching section 44b again to clear said flange section. When this occurs, said casing C4 is swung to open position under the influence of its spring 42.

With the arrangement shown, both casings C4 are latched in closed position in the same manner. This may be effected simultaneously if desired and the release of said casings C4 may likewise be effected simultaneously. Or, if desired, such casings may be released independently or singly.

With the form of my invention shown in Figures 4–7, the front and rear walls 47 and 48 of the casing C3 are curved although, if desired, said walls may be plane in correspondence with the wall 4 of Figures 2 and 3. Where curved walls are thus employed, the depth of the cigarette-containing casings C4 should be greater than the corresponding casing C of Figures 1, 2, and 3; furthermore, it is desirable, under such circumstances, that each keeper 43 inherently retains a curved configuration as illustrated in Figure 6.

In the form of my invention shown in Figures 4–7, the pyrophoric lighting mechanism has been illustrated as of the same character as in Figures 1, 2, and 3. It shall be understood, however, as hereinbefore stated that the lighting mechanism may be of any suitable character.

It will be observed that the wall structure 49 at the top of casing C3 constitutes a supplementary casing in part receiving the pyrophoric lighting mechanism. This is not shown in Figures 1–3, and, in passing, it should be noted that opposite side walls of said wall structure have the same function as the standard 18 of Figures 1–3, namely, that they serve as a support for the pin 17.

Ordinarily, the herein described casings are formed of sheet metal and, if desired, the outer surface of the casing wall 4 may be highly polished to serve as a mirror.

As herein described, it is a fuel casing wall 4, 47 or 48, which serves as a closure member for a cigarette-containing casing, said wall 4, 47 or 48 then, as the case may be, having a dual function; that is, they serve as a part of the enclosure for the fuel receptacle and as a part of the enclosure for the cigarette-containing casing. It shall be understood that, as regards said wall 4, 47 or 48, or equivalent, my invention is broad and general and further it shall be understood that the utilization of any wall or surface of or associated with a fuel casing as a closure member for the companion casing C is within the purview of my invention.

Ordinarily and preferably, the casings to be associated are pivotally related but, if desired, they may be slidably, detachably or otherwise suitably connected.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a device of the character described, a fuel casing comprising side wall structure to which top and bottom walls are fixed in immovable position, pyrophoric spark-producing mechanism disposed above and secured to said fixed top wall, and a plurality of cigarette-containing casings pivoted to said fuel casing along the same edge thereof, said cigarette-containing casings adapted to be closed upon opposite exterior walls of said fuel casing respectively, said opposite walls of said fuel casing being substantially coextensive with and closing the respective openings of said cigarette-containing casings, said lighting mechanism comprising a member disposed above said top wall for manual operation.

2. In a device of the character described, a fuel casing comprising side wall structure to which top and bottom walls are fixed in immovable position, pyrophoric lighting mechanism disposed above and secured to said fixed top wall, and a cigarette-containing casing pivoted to said fuel casing along one edge thereof, said casings having substantially the same peripheral configuration and one wall of said fuel casing, when said casings are closed upon each other, being substantially coextensive with and closing the opening to said cigarette-containing casing, said lighting mechanism comprising a member disposed for manual operation above said fixed top wall.

LOUIS V. ARONSON.